Sept. 25, 1962 L. R. BORN, JR 3,055,236
PLANETARY GEAR PULLEY AND CONTROL MEANS
Filed Aug. 5, 1960 3 Sheets-Sheet 1

INVENTOR
Lester R. Born, Jr.

BY

ATTORNEYS

Sept. 25, 1962   L. R. BORN, JR   3,055,236
PLANETARY GEAR PULLEY AND CONTROL MEANS
Filed Aug. 5, 1960   3 Sheets-Sheet 2

INVENTOR
Lester R. Born, Jr.

BY
ATTORNEYS

Sept. 25, 1962　　　L. R. BORN, JR　　　3,055,236
PLANETARY GEAR PULLEY AND CONTROL MEANS
Filed Aug. 5, 1960　　　　　　　　　　　3 Sheets-Sheet 3
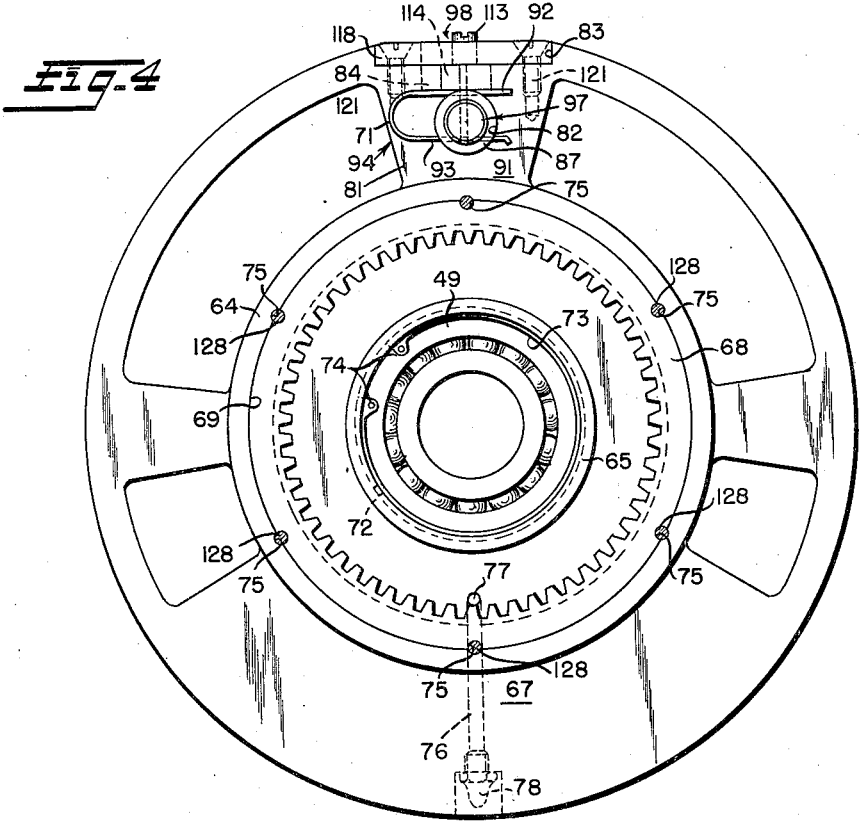
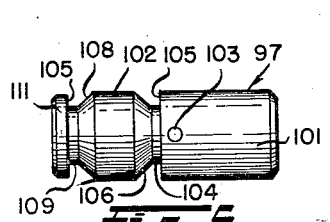
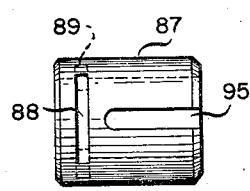
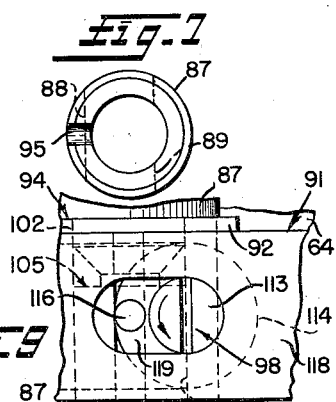
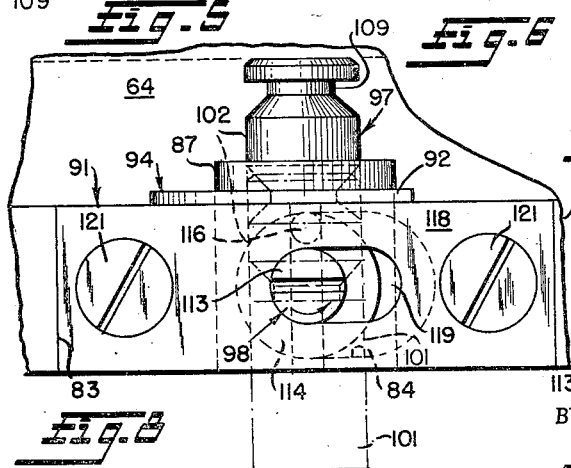
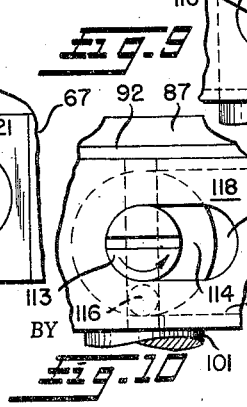
INVENTOR
Lester R. Born, Jr.
ATTORNEYS United States Patent Office 3,055,236
Patented Sept. 25, 1962

3,055,236
PLANETARY GEAR PULLEY AND CONTROL
MEANS
Lester Raymond Born, Jr., Bellefontaine, Ohio, assignor to Rockwell Manufacturing Company, Pittsburgh, Pa., a corporation of Pennsylvania
Filed Aug. 5, 1960, Ser. No. 47,752
3 Claims. (Cl. 74—785)

The present invention relates to planetary gear pulleys and more particularly to a planetary gear pulley adapted to provide a two speed drive ratio for each of a plurality of belt adjustments and a simple and rugged control for effecting the control of the planetary gear system.

Planetary gear pulleys for use in belt drive systems of various kinds, including machine tool drives, are well known in the art as will be appreciated from a consideration of United States Letters Patent 252,537 issued January 17, 1882, to John Stewart, 437,068 issued September 23, 1890, to L. E. Whiton, 2,321,960 issued June 15, 1943, to J. S. Wearn, 2,399,451 issued April 30, 1946, to E. C. Rothacker and 2,517,875 issued August 8, 1950, to P. F. Henry. The present invention is an improvement in such pulleys adapted primarily for driving the spindles of machine tools.

The primary object of this invention is to provide a simplified planetary gear pulley assembly that is rugged, compact and readily controlled and adapted to low cost quantity production methods.

Another important object of the present invention is to provide a multi-speed planetary gear pulley with a planetary gear control which is rugged, simple and readily operable.

Still another object of the present invention is to provide a planetary gear pulley assembly with a planetary gear control in the form of a connector pin assembly including a single connector pin adapted to be shifted axially between a position coupling the ring and sun gear mounting members for unitary rotation and a position fixing one of said members against rotation to establish relative planetary rotation between said members.

A more specific object of the present invention is to provide a planetary gear pulley composed of a multi-step, hollow sided, pulley body having a sun gear fixed to its inner end face wall, a driven shaft journalling the pulley body and fixedly carrying a planet gear carrier and planet gears meshing with the sun gear and an end closure plate journalled on the driven shaft and having an internal toothed ring gear fixed to it in encircling meshed relation to the planet gears with an axially shiftable connector pin disposed in the end closure plate adjacent to and accessible through the periphery of the end closure plate and adapted to be shifted between a position coupling the pulley body and end closure plate effecting unitary highspeed rotation of the pulley body, end closure plate and the driven shaft and a position coupling the end closure plate to a stationary member and permitting relative planetating rotation of the pulley body and end closure plate and reduced speed drive of the driven shaft.

Another object of the present invention is to provide the connector pin of the preceding object with shifter means in the form of a headed pin mounted for rolling movement in a guide slot in the end closure plate with its shank end kerfed and accessible through the periphery of the end closure plate and having an eccentric drive pin mounted in the head and coupled to the connector pin through a slotted connector pin mounting sleeve.

Still further objects will appear from the following description and appended claims when read in connection with the accompanying drawings wherein:

FIGURE 4 is a top plan view of the end closure plate of FIGURE 1 with the plate revolved 90° counterclockwise from the position shown in FIGURE 1;

FIGURE 5 is a detailed side elevational view of the connector pin of FIGURE 1;

FIGURE 6 is a side elevational view of the connector pin mounting sleeve looking into the axially slotted side thereof;

FIGURE 7 is an end view of the sleeve of FIGURE 6 as viewed from the right end of FIGURE 6;

FIGURE 8 is a fragmental elevational view of the end closure plate as viewed from the right of FIGURE 1 and looking into the peripheral notch provided in the end closure plate for mounting the connector pin shifter means and its retainer plate and illustrating the extreme positions of the connector pin in its two operative positions;

FIGURE 9 is a fragmental view similar to FIGURE 8 but showing the position of the connector pin shifter means, the connector pin and its drive pin in their intermediate positions during shifting of the connector pin from its solid line position to its dotted line position of FIGURE 8;

Figure 11:
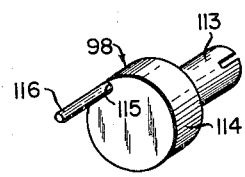

FIGURE 10 is a view similar to FIGURE 9 illustrating the position of the connector pin shifter means, the connector pin and its drive pin when the connector pin assumes the dot-dash line position of FIGURE 8; and FIGURE 11 is a perspective view of the connector pin shifter means provided to connect the end closure plate selectively to the pulley sheave or to a stop plate to effect the desired speed setting of the pulley assembly.

Figure 1:
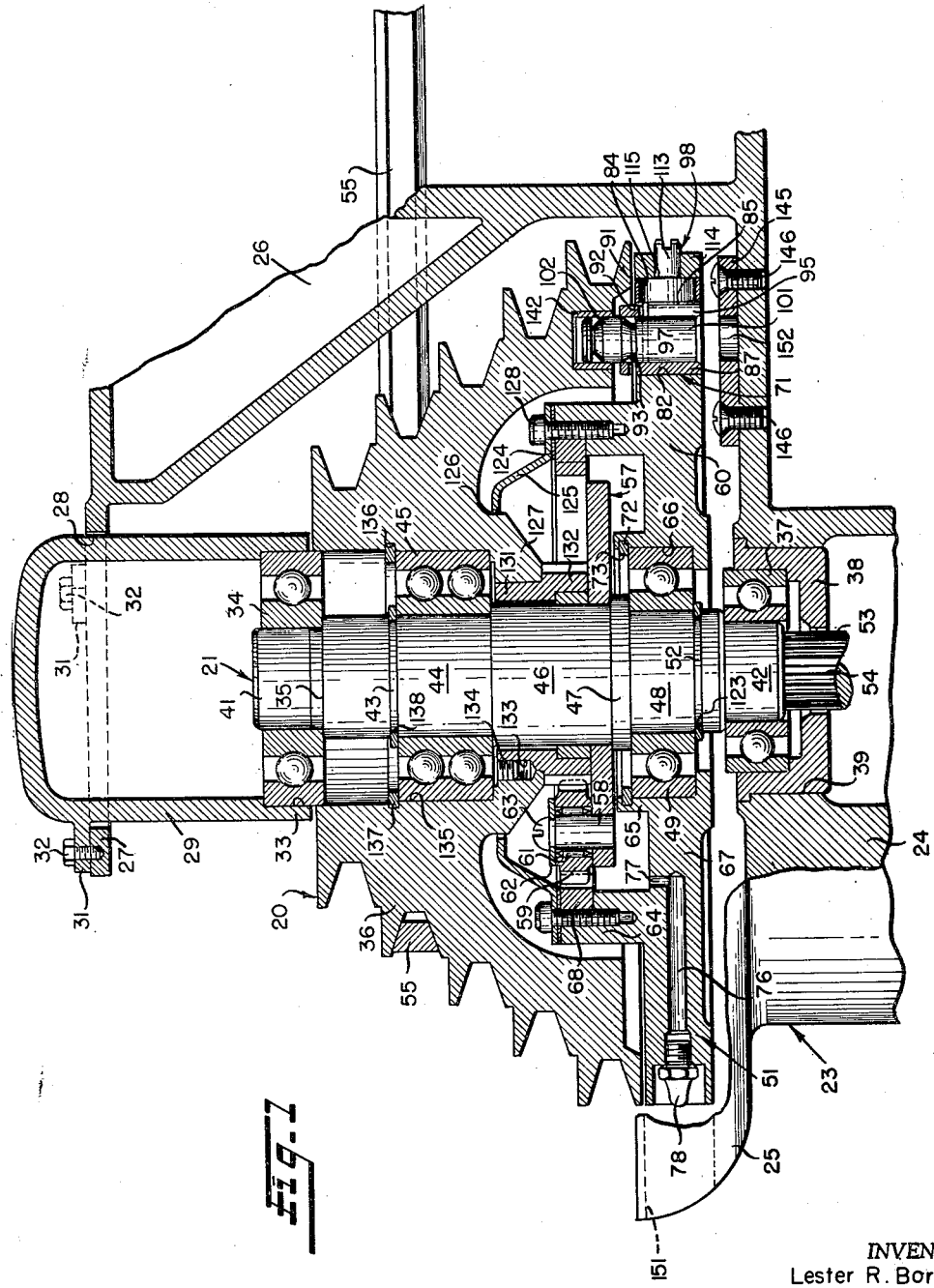
FIGURE 1 is a vertical sectional view through a planetary gear pulley made in accord with the present invention and mounted in the head plate of a drill press.

With continued reference to the drawings wherein the same reference numerals are used throughout to indicate the same parts, the planetary gear pulley assembly 20 of the present invention is shown mounted on a stub adaptor shaft 21 the lower end of which is splined for ready reception of the matingly splined spindle of the machine tool upon which it is to be used. FIGURE 1 illustrates the pulley assembly installed on a bench type drill press of the type shown in United States Letters Patent 2,396,733 issued March 19, 1946, to C. A. Wiken et al. The head casting 23 of such a drill press is made up of a vertically bored main body portion 24 and a rimmed pulley guard plate 25 having an upstanding support bracket 26 providing an overhanging arm 27 containing a through opening 28 to receive in depending fashion an upper spindle end bearing support cap 29. Cap 29, as shown in FIGURE 1, is provided with a plurality of peripherally spaced, outwardly protruding securing ears 31 adapting cap 29 for bolted attachment to arm 27 by cap screws 32. The lower end of bearing support cap 29 is annularly recessed at 33 to receive the outer race of a single row ball bearing 34 which journals the uppermost protruding end 41 of stub adaptor shaft 21 and is supported by engagement of its inner race with the upper face of shoulder 35 formed on shaft 21. The lower end of shaft 21 is journalled in a single row ball bearing 37 seated in a bearing cup 38 interfitted in a shouldered upwardly opening recess 39 formed in body 24 of head casting 23.

Shaft 21 between the end bearing seats 41 and 42 cooperating with bearings 34 and 37 is provided with a retainer ring groove 43, a further bearing seat 44 for a double row ball bearing 45 provided to journal pulley body 36, an enlarged axially extending spacer portion 46 terminating at its lower end in an annularly enlarged support shoulder 47, a bearing seat 48 for a single row ball bearing 49 provided to journal an end closure plate assembly 51 forming a part of pulley assembly 20 and a retainer ring groove 52. Cup 38 is centrally apertured at 53 to freely pass the upwardly extending, externally splined stem portion 54 of the drill press spindle which is suitably formed and connected in the manner shown in the aforesaid Letters Patent 2,396,733 or any other suitable manner to drive the tool chuck conventionally provided on such drill presses. Shaft 21 is, accordingly, effectively journalled for rotation in the drill press head casting 23 for true rotation therein so that belt drive pressures imposed by the motor driven drive belt 55 will not cant the shaft or the connected spindle 54. It will be appreciated from the following description that this shaft journalling relation is effected after planetary gear pulley assembly 20 is mounted on shaft 21. This is made possible since assembly and disassembly of the planetary gear pulley assembly 20 and spindle portion 54 is effected merely by removal of cap 29, vertically lifting pulley assembly 20 out of bearing 37 and off the end of spindle portion 54 and then bodily shifting the removed pulley assembly transversely toward the left as seen in FIGURE 1 through the clear space between belt guard plate 25 and bracket arm 27. Bearing 34 is free to then be removed axially from seat 35 to be used with lower bearing 37 to journal a standard or other belt pulley should this be desired.

Figure 3:
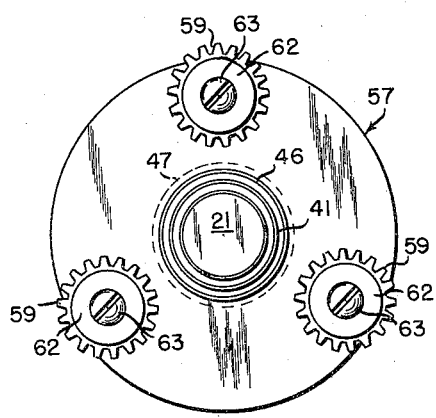
FIGURE 3 is a top plan view of the planet gear carrier of FIGURE 1 as seen when viewed looking toward the upper face in FIGURE 1.

The pulley assembly 20 is readily assembled in the following manner starting with the stub adaptor shaft 21 previously described. The first step is to assemble the planet carrier plate assembly 57 on the spacer portion 46 of shaft 21 in abutting engagement with support shoulder 47. Preferably this assembly step is taken after the hardened steel planet gear stub shafts 58 are press fitted and welded in the carrier plate shaft apertures formed near the periphery of the plate and the planet gears 59 and their needle bearings 61 are mounted on shafts 58 and secured in place by retainer washers 62 and retainer screws 63 threaded into tapped openings in the free ends of stub shafts 58. In other words, the planet carrier plate assembly 57 of FIGURE 3 is bodily placed in coaxially aligned position to spacer portion 46 of shaft 21, pressed thereon until it abuts shoulder 47 and is then preferably brazed to portion 46 to permanently and securely fix the carrier plate assembly 57 to shaft 21.

The end closure plate assembly 51 comprising webbed plate member 60 having the inset annular boss 64 and hub 65 containing stepped center bore 66 and counterweight web portion 67, the internal toothed ring gear 68 seated in annular recess 69 of boss 64, journal bearing 49 and connector pin assembly 71 is then assembled for bodily attachment to bearing seat 48 of shaft 21. To this end, stepped bore 66 adjacent its upper end as seen in FIGURES 1 and 4 is provided with a retainer ring groove 72 to receive split retainer ring 73 securing bearing 49 in stepped bore 66. As seen in FIGURE 4, ring 73 has apertured ears 74 for receiving a suitable tool for compressing ring 73 in assembling it in groove 72.

Ring gear 68 and boss 64 are suitably adapted to fixedly non-rotatably secure ring gear 68 in annular recess 69 by drilling and tapping a series of bolt holes 75 therein (FIGURE 4) using the parting line between the ring gear outer wall and the annular wall of recess 69 as a center. Bolt holes 75 are fitted with retainer screws as will presently appear.

Plate member 60 along a diameter bisecting counterweight web portion 67 is radially drilled to form a lubricating passage 76 the inner end of which intersects a drilled cross passage 77 leading to the annular space provided between boss 64 and hub 65. The outer end of passage 76 is tapped and counterbored to receive a suitable grease fitting 78 through which lubricant is supplied to lubricate the planetary gearing of pulley assembly 20.

Diametrically opposite passage 76 in plate web 67, there is provided a second web portion 81 having an axially extending through bore 82 and a peripheral notch 83 the bottom wall of which is recessed to a depth to intersect bore 82 and form an elongated guide slot 84. As best seen in FIGURES 4, 8, 9 and 10 the long dimension of guide slot 84 extends in an annular direction with respect to the rotational axis of end closure plate assembly 51 with one end formed around a center lying midway between the peripheral wall edges and in a plane containing the rotational axis of assembly 51. As a consequence, the area of intersection between bore 82 and slot 84 forms an axial slot 85 (FIGURE 1) bisected by the aforementioned plane and having a purpose to be presently pointed out.

Bore 82 is adapted to receive a connector pin mounting sleeve 87 (FIGURE 6) of a length slightly exceeding the axial length of bore 82 so one end, diametrically oppositely grooved at 88 and 89 inwardly therefrom, protrudes beyond face 91 of web 81 sufficiently to permit the legs 92 and 93 of a hairpin type spring member 94 which are biased toward one another to enter grooves 88 and 89. As best seen in FIGURE 7, groove 89 is substantially deeper than groove 88 and actually intersects the sleeve bore. As a consequence, leg 93 of spring 94 will normally extend in chord-like fashion across the bore of sleeve 87 as indicated in FIGURE 1. The sleeve 87 along the side diametrically opposite groove 89 is provided with an axial through slot 95 extending inwardly from the other end of the sleeve to a point short of the inner wall faces of the grooves 88 and 89 (FIGURES 1 and 6). Slots 85 and 95 in properly assembled relation of sleeve 87 in bore 82 lie in axial aligned communicating relation providing free communication throughout their cooperating lengths between the bore of sleeve 87 and elongated slot 84 in plate web 81. This free communication and slot 84 permits usage of the novel connector pin 97 (FIGURE 5) and connector pin shifter means 98 (FIGURES 1, 4, 8, 9 and 10) about to be described.

Referring first to connector pin 97, a pin having a body 101 of a length equal to the length of bore 82 and a body end extension 102 is dimensioned to slidingly fit into the bore of sleeve 87. Body 101 adjacent end extension 102 is provided with a diametrical through bore 103 (FIGURE 5) and the end extension 102 adjacent body 101 is provided with a reduced diameter section 104 forming a sharp shoulder 105 at its juncture with body 101. At its other end reduced section 104 merges into a conical wall section 106 terminating with a cylindrical section of substantially the same diameter as body 101 and extending axially for a distance about twice the clearance space between web face 91 and the opposed recess defining end face 107 of pulley body 36 when assembled as shown in FIGURE 1. At its other end the cylindrical section of pin end extension 102 connects with a conical wall section 108 sloping axially inwardly to a second reduced diameter section 109 identical to section 104 and forming a sharp shoulder 105 with the terminal enlargement 111 having a diameter substantially equal to that of body 101. This end extension 102 forms a combined spring camming and pulley sheave connector while the opposite free end of body 101 forms a stop plate connector as will more fully hereinafter appear.

The connector pin shifter means 98 (FIGURE 11) comprises a pin having a shank 113 and an enlarged head 114 apertured at 115 adjacent its periphery to receive in force fit relation one end of a drive pin 116 which extends through axial slots 85 and 95 into loose but close fitting relation with connector pin throughbore 103. The connector pin shifter means 98 is disposed with its head 114 in slot 84 of end closure plate 60 and its shank 113 projecting outwardly through plate notch 83 so its free kerfed end will be accessible at the periphery of plate 60. A retainer plate 118 shaped to fit notch 83 and having an elongated slot 119 to rollingly cooperate with pin shank 113 is secured in notch 83 by screws 121 in edge overlapped relation to head 114 to retain shifter means 98 in operative assembly in slots 84 and 119. The operation of connector pin 97 and its shifter means 98 will be pointed out presently. It should be noted, however, at this point that counterweight web portion 67 counterbalances the weight of connector pin 97 and its associated support sleeve 87, spring 94, shifter means 98 and the retainer plate 118 and its securing screws assuring smooth rotation of assembly 51 when connected to pulley body 36.

The end closure plate assembly 51 is preferably assembled on shaft 21 by entering the lower end of the shaft through the bore of bearing 49 until the inner bearing race abuts the under face of support shoulder 47 and ring gear 68 is meshed with planet gears 59. A split retainer ring 123 entered in shaft groove 52 and engaging the opposite end of the inner race of bearing 49 secures end closure plate assembly 51 to shaft 21 in operative position. A sealing gasket 124 and a cover plate 125 having a center opening 126 to freely encircle the internal hub portion 127 of pulley body 36 are then lowered onto the end face of annular boss 64 and secured thereto by cap screws 128 threaded into bolt holes 75 formed partly in ring gear 68 and boss 64 as previously pointed out.

Figure 2:
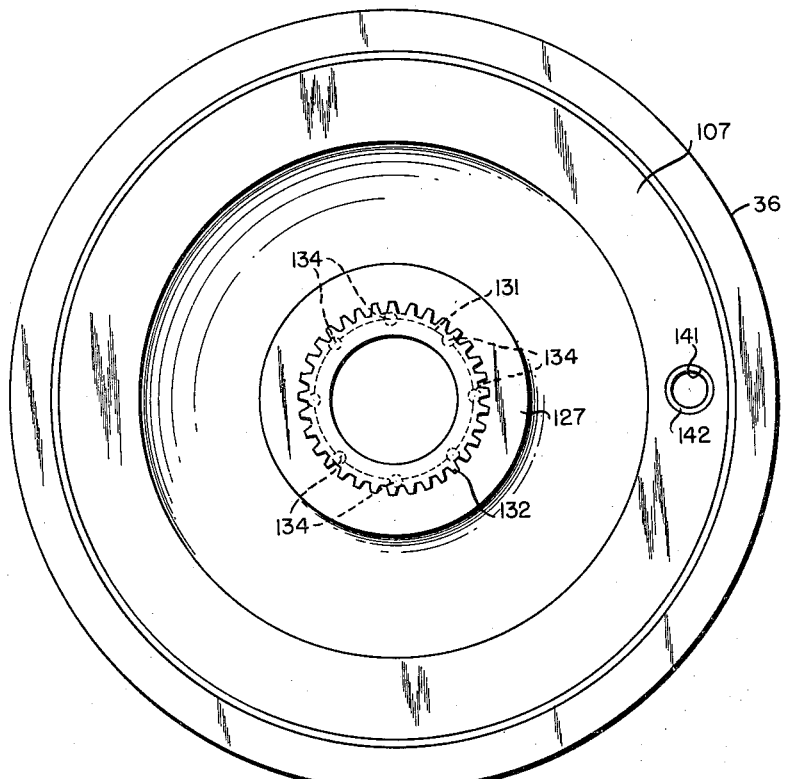
FIGURE 2 is a bottom plan view of the pulley member of FIGURE 1 as seen from the recessed end.

Pulley body 36 is adapted to serve as a housing for the planetary gear assembly by recessing its lower end between hub 126 and annular end face 107 and as a sun gear carrier by entering the hub end 131 of a sun gear 132 upwardly into the smaller diameter bore of hub 127 until the gear body abuts the hub end face. The hub 127 and sungear 132 are fixedly connected for unitary rotation by drilling and tapping screw holes 133 spaced angularly along the parting line between their mating annular surfaces and inserting socket ended set screws 134 into screw holes 133. This drilling and tapping operation is performed, after sun gear 132 is initially assembled, through the enlarged upper bearing counterbore 135. Counterbore 135 midway of its length is provided with an annular retainer ring groove 136 separating counterbore 135 into inner and outer axially spaced bearing ring seats respectively adapted to receive double row ball bearings 45 and 35 as illustrated in FIGURE 1. A split retainer ring 137 entered into groove 136 secures the outer race of bearing 45 in the inner bearing seat while a split retainer ring 138 engaged in ring groove 43 secures the inner race of bearing 45 to shaft 21 to complete the planetary gear pulley assembly 20. These rings, of course, are assembled at the factory before assembly of the planetary gear pulley assembly 20 with the machine tool on which it is to be used and after the pulley body end face 107 is drilled at 141 (FIGURE 2) to receive a press fitted connector pin wear sleeve 142 dimensioned to freely but closely receive the connector pin end extension 102.

From the preceding description, it will be apparent that the present invention provides a unitary planetary gear pulley assembly 20 which can be factory produced and sold together with a suitable stop plate 145 and attachment screws 146 (FIGURE 1) as an accessory item. The resulting accessory item will have the protruding shaft portion 42 to fit within the pulley shaft support bearing 37 provided as a part of the machine tool and outer bearing ring seat to receive the pulley shaft support bearing 34 also provided as a part of the machine tool.

Assuming the planetary gear pulley assembly 20 to be mounted to serve as the spindle drive pulley of a drill press as illustrated in FIGURE 1, the available spindle drive speeds effected by shifting drive belt 55 between the various belt grooves will be doubled. For example, if the drill press equipped with pulley assembly 20 is provided with a drive motor equipped with a standard mating five step pulley ten spindle speeds, five in direct belt drive and five in gear drive will be provided. One illustrative example, using a 1725 r.p.m. motor and the manufacturer's standard five step pulley set provides spindle drive speeds of 500–800–1200–1800 and 2600 r.p.m. Substituting the pulley of this invention as the spindle drive pulley, the speed range will be from 165 r.p.m. to 2600 r.p.m., the additional drive speeds provided being 165–280–420–630 and 910 r.p.m.

Operation of the pulley assembly 20 to change speeds is a simple matter. The pulley assembly 20 is rotated by hand to present the kerfed end of pin shaft 113 to the rear of the guard plate lip and overplate 145 located as shown in FIGURE 1 or to plate 145 located adjacent an access opening 151 (FIGURE 1) which may be provided in the belt guard plate lip, a screw driver is inserted into the kerf and the shifter means 98 is rotated in a counter-clockwise direction (see FIGURE 8). This forces drive pin 116 against the sidewalls of slots 85, 95 of plate 60 and sleeve 87 causing head 114 and shank 113 to roll toward the right and drive pin 116 to move downwardly along slots 85 and 95 drawing connector pin 97 downwardly to disengage and extension 102 from the wear sleeve 142 in pulley body 36 and simultaneously move the free end of pin body 101 downwardly toward the pin aperture 152 in stop plate 145. As pin 116 reaches the half way point in its movement along slots 85 and 95, head 114 and shank 113 reach the opposite ends of their respective slots as shown in FIGURE 9. Continued counterclockwise movement causes drive pin 116 to continue its descent until it reaches the position shown in FIGURE 10 at which time the free end of pin 101 will have reached the dot-dash line position of FIGURE 8 with spring 94 in the end notch of extension 102 and extension 102 withdrawn into sleeve 87 freeing pulley body 36 for relative rotation with respect to end closure plate 60. Simultaneously the free end of body 101 will have entered into pin aperture 152 of stop plate 145 locking end closure plate 60 against rotation. In this position of connector pin 97, the reduced speed drive through the planetary transmission will be effected in the particular belt setting.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A multi-speed pulley assembly for belt driven machine tools comprising a pulley body having at least one external pulley groove in its periphery and a recessed end face delimited by an annular axially facing wall portion; a sun gear fixed in said recessed end face in coaxial relation to said pulley body; a shaft rotatably journalling said pulley body and having an end adapted for driving connection to the drive shaft of a machine tool to be fitted with said pulley assembly; a planet gear carrier fixed to said shaft in adjacent axially spaced relation to said sun gear; an end closure plate journalled on said shaft in adjacent axially spaced relation to said planet gear carrier and having an internal toothed ring gear thereon disposed in encircling radially outwardly spaced relation to said sun gear; planet gears journalled on said planet gear carrier in meshed engagement with said sun gear and said ring gear; means for journalling said shaft on a stationary portion of said machine in driving engagement with the drive shaft of said machine tool; a connector pin assembly comprising a sleeve element having a body fixed in said end closure plate and an end protruding from one face of said closure plate, said protruding end having external groove means therein intersecting the sleeve bore to form a slot opening into the bore of said sleeve, a connector pin having a main body portion axially shiftably supported in said sleeve bore with its opposite ends respectively opposed to said annular axially facing wall portion of said pulley body and the stationary portion of said machine tool, a body extension at said one sleeve end formed with axially spaced annular grooves adapted to alternately be aligned with said sleeve slot to establish two operative positions of said connector pin, and spring means having opposed spring legs normally biased toward each other and disposed in said groove means with one leg lying in said sleeve slot to snap in and out of said respective connector pin grooves as said connector pin is shifted between its operative positions; pin end coupling means on said axially facing wall portion of said pulley body and on said stationary portion of said machine tool; and connector pin shifter means having a portion protruding from said end closure plate adapted to be operated to selectively shift said connector pin to connect said end closure plate with said pulley body to establish unitary rotation of said shaft, said end closure plate and said pulley body and to connect said end closure plate and said stationary portion of said machine tool to establish a reduced speed drive of said shaft through the planetary gear system provided by said ring gear, said planet gears and said sun gear.

2. The two speed pulley assembly of claim 1 wherein said sleeve element along one side of the body is provided with an axially directed slot, said pin adjacent said body extension is provided with a diametrically directed through bore having one end in communication with said slot and said connector pin shifter means comprises a headed pin having its head mounted in said end closure plate for rolling movement in an elongated guide slot opening through its base to said sleeve slot and having a drive pin eccentrically mounted in the head of said pin with one end protruding through said sleeve slot and into said pin bore, said drive pin upon rolling movement of said headed pin being adapted to traverse said sleeve slot and shift said connector pin between its two operative positions.

3. The two speed pulley assembly of claim 2 wherein said headed pin has its shank extending outwardly beyond the periphery of said end closure plate and a retainer plate slotted in parallelism to said end closure plate slot to guidingly receive said shank is bolted to said end closure plate to hold said headed pin against axial disassociation.

References Cited in the file of this patent
UNITED STATES PATENTS

| | | |
|---|---|---|
| 582,750 | Leaycraft | May 18, 1897 |
| 2,399,451 | Rothacker | Apr. 30, 1946 |
| 2,413,763 | Heyer | Jan. 7, 1947 |
| 2,517,875 | Henry | Aug. 8, 1950 |
| 2,544,061 | Barnett | Mar. 6, 1951 |
| 2,877,668 | Kelbel | Mar. 17, 1959 |

FOREIGN PATENTS

| | | |
|---|---|---|
| 1,178,866 | France | May 15, 1959 |